United States Patent
Piraccini et al.

(10) Patent No.: US 10,260,349 B2
(45) Date of Patent: Apr. 16, 2019

(54) TUBINE BLADE AND RELATED METHOD OF FORMING

(71) Applicant: General Electric Company, Schenectady, NY (US)

(72) Inventors: Francesco Piraccini, Ehrendingen (CH); Andreas Helmut Kaiser, Bad Sackingen (DE); Pierre-Alain Masserey, Wurenlos (CH); Arnd Neuer, Weinheim (DE)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 15/377,060

(22) Filed: Dec. 13, 2016

(65) Prior Publication Data

US 2018/0100397 A1 Apr. 12, 2018

Related U.S. Application Data

(60) Provisional application No. 62/407,287, filed on Oct. 12, 2016.

(51) Int. Cl.
| | | |
|---|---|---|
| *F01D 5/14* | (2006.01) | |
| *F01D 5/00* | (2006.01) | |
| *F01D 5/22* | (2006.01) | |
| *B23P 6/00* | (2006.01) | |
| *F01D 5/28* | (2006.01) | |

(52) U.S. Cl.
CPC .............. *F01D 5/005* (2013.01); *B23P 6/005* (2013.01); *F01D 5/225* (2013.01); *F01D 5/28* (2013.01); *F01D 5/286* (2013.01); *F01D 5/288* (2013.01); *F05D 2220/31* (2013.01); *F05D 2220/32* (2013.01); *F05D 2230/232* (2013.01);

(Continued)

(58) Field of Classification Search
CPC .......... F01D 5/005; F01D 5/147; F01D 5/286; F01D 25/007; F05D 2240/303; F05D 2240/304; F05D 2260/95
See application file for complete search history.

(56) References Cited

U.S. PATENT DOCUMENTS

| | | | |
|---|---|---|---|
| 3,650,635 A | 3/1972 | Wachtell et al. | |
| 6,508,000 B2 * | 1/2003 | Burke | B23P 6/005 29/889.1 |

(Continued)

FOREIGN PATENT DOCUMENTS

| | | |
|---|---|---|
| EP | 2 317 075 A1 | 5/2011 |
| EP | 2 781 691 A1 | 9/2014 |
| EP | 2 949 418 A1 | 12/2015 |

OTHER PUBLICATIONS

Extended European Search Report and Opinion issued in connection with corresponding EP Application No. 17195941.4 dated Apr. 16, 2018.

*Primary Examiner* — Ninh H. Nguyen
(74) *Attorney, Agent, or Firm* — Ernest G. Cusick; Hoffman Warnick LLC

(57) ABSTRACT

The disclosure provides a turbine blade. A turbine blade includes a shroud at a tip of the blade and an airfoil having a leading edge extending between the shroud and a root of the blade; a cutout portion extending at least along the leading edge of the airfoil nearest the shroud; an insert welded to the cutout portion at a weld region; and a weld-free region located between the insert and the cutout portion nearest the shroud.

19 Claims, 6 Drawing Sheets

(52) U.S. Cl.
CPC .... *F05D 2230/80* (2013.01); *F05D 2240/307* (2013.01); *F05D 2300/701* (2013.01)

(56) References Cited

U.S. PATENT DOCUMENTS

| | | | |
|---|---|---|---|
| 6,575,702 B2 * | 6/2003 | Jackson | B23P 6/005 29/402.13 |
| 7,780,419 B1 * | 8/2010 | Matheny | F01D 5/005 416/221 |
| 8,539,659 B2 * | 9/2013 | Szela | B21K 3/04 29/402.13 |
| 9,452,474 B2 * | 9/2016 | Xu | B23P 6/005 |
| 2012/0183410 A1 | 7/2012 | Imano et al. | |

* cited by examiner

TUBINE BLADE AND RELATED METHOD OF FORMING

FIELD OF THE INVENTION

The disclosure relates generally to forming turbine blades, and more particularly, to a forming a turbine blade having an insert welded to an edge of the turbine blade.

BACKGROUND OF THE INVENTION

Steam turbine blades are affected by heavy water droplet erosion (WDE). Similarly, gas turbine blades are affected by corrosion. This disclosure relates to forming a blade having an insert welded to a leading edge and/or a trailing edge of an airfoil. This insert can be used to repair heavy erosion or corrosion with a reduced cost with respect to other methodologies with a lower risk of cracking.

Current methods of repairing turbine blades have a number of disadvantages. For example, some current methods for repairing WDE fail to repair the leading edge section nearest the shroud. The leading edge nearest the shroud is typically the section of the airfoil that experiences the highest WDE. It is very important to maintain original material shapes and characteristics in this section of the blade. During a repair, a weld may be used to attach a replacement leading edge to the airfoil. The weld creates high temperatures in the blade material and the high temperatures can cause deformations and other undesirable changes in the shroud material, for example, causing the material to become brittle. Since welding near the shroud causes undesirable heat damage, conventional blade repair does not address the leading edge nearest the shroud.

In examples that do address the leading edge of the airfoil nearest the shroud, the entire shroud is replaced. This type of repair method includes added costs of materials and machining.

BRIEF DESCRIPTION OF THE INVENTION

A first aspect of the disclosure provides a turbine blade. The turbine blade includes a shroud at a tip of the blade and an airfoil having a leading edge extending between the shroud and a root of the blade; a cutout portion extending at least along the leading edge of the airfoil nearest the shroud; an insert welded to the cutout portion at a weld region; and a weld-free region located between the insert and the cutout portion nearest the shroud.

A second aspect of the disclosure provides a method for repairing a turbine blade having a shroud at a tip of the blade. The method includes removing a portion of a leading edge of an airfoil to form a cutout portion, the removed portion including at least a portion of the leading edge nearest the shroud; and welding an insert to the cutout portion only at a weld region, wherein the weld region is located a distance from the shroud.

A third aspect of the disclosure provides a turbine blade. The turbine blade includes a platform at a root of the blade and an airfoil having a trailing edge extending between the platform and a tip of the blade; a cutout portion extending at least along the trailing edge of the airfoil nearest the platform; an insert welded to the cutout portion at a weld region; and a weld-free region located between the insert and the cutout portion nearest the platform.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

DETAILED DESCRIPTION OF THE INVENTION

Figure 1:
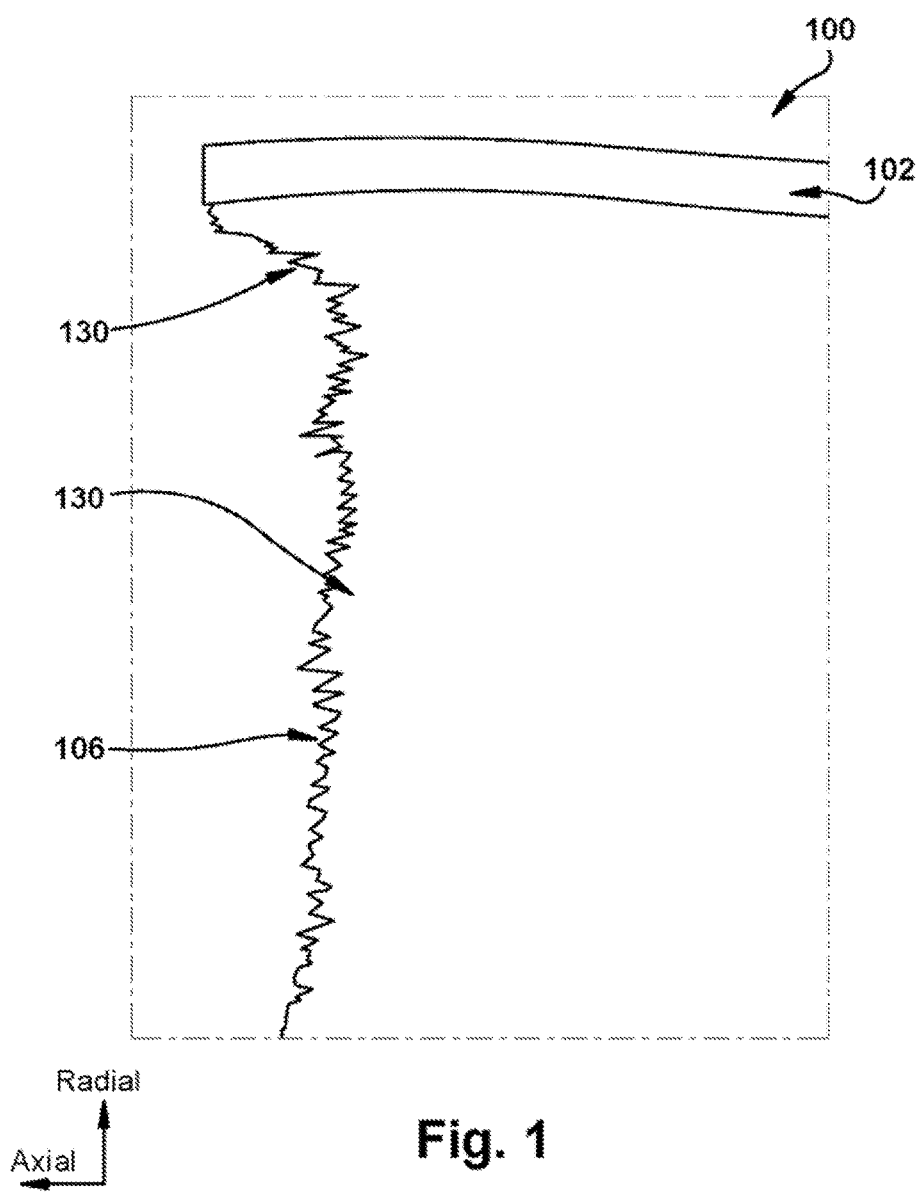
FIG. 1 shows a side view of a turbine blade with heavy water droplet erosion (WDE).

As an initial matter, in order to clearly describe the current disclosure it will become necessary to select certain terminology when referring to and describing relevant directions of a turbine blade. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis, e.g., of the rotor of the turbine engine. Finally, the term "circumferential" refers to movement or position around an axis. It will be appreciated that such terms may be applied in relation to the center axis of the turbine.

The present disclosure relates to a turbine blade having an insert welded to a leading edge and/or a trailing edge of the airfoil. For the sake or brevity, an example embodiment of a repaired turbine blade and a method of repairing a turbine blade that has WDE damage is described. However, it should be understood that the teachings of this disclosure are not limited to steam turbine blades with WDE. A person skilled in the art will recognize that the teachings of this disclosure may be applied to any turbine blade. For example, the teachings of this disclosure may be applied to a leading edge of a rotating blade or a trailing edge of a stationary blade. It should be understood that the teachings of this disclosure may be applied to steam turbine blades and gas turbine blades. It should also be understood that the teachings of this disclosure may be applied to an undamaged blade to preemptively strengthen the blade.

FIG. 1 shows a side view of a turbine blade 100 with heavy water droplet erosion (WDE). Typically, this type of erosion is dealt with by cutting blade 100 (usually a steam turbine blade) to remove the erosion, but not up to shroud 102 of blade 100. Leading edge 106 near shroud 102 remains damaged when using this type of repair. Other methods of WDE repair include replacing entire shroud 102. This type of repair method is expensive and time-consuming. A third method of WDE repair includes build-up welding. Build-up welding damages blade 100 with heat deformation, heat-induced stresses, and increased blade material brittleness, while failing to fortify blade 100 with a hardened material.

Figure 2:
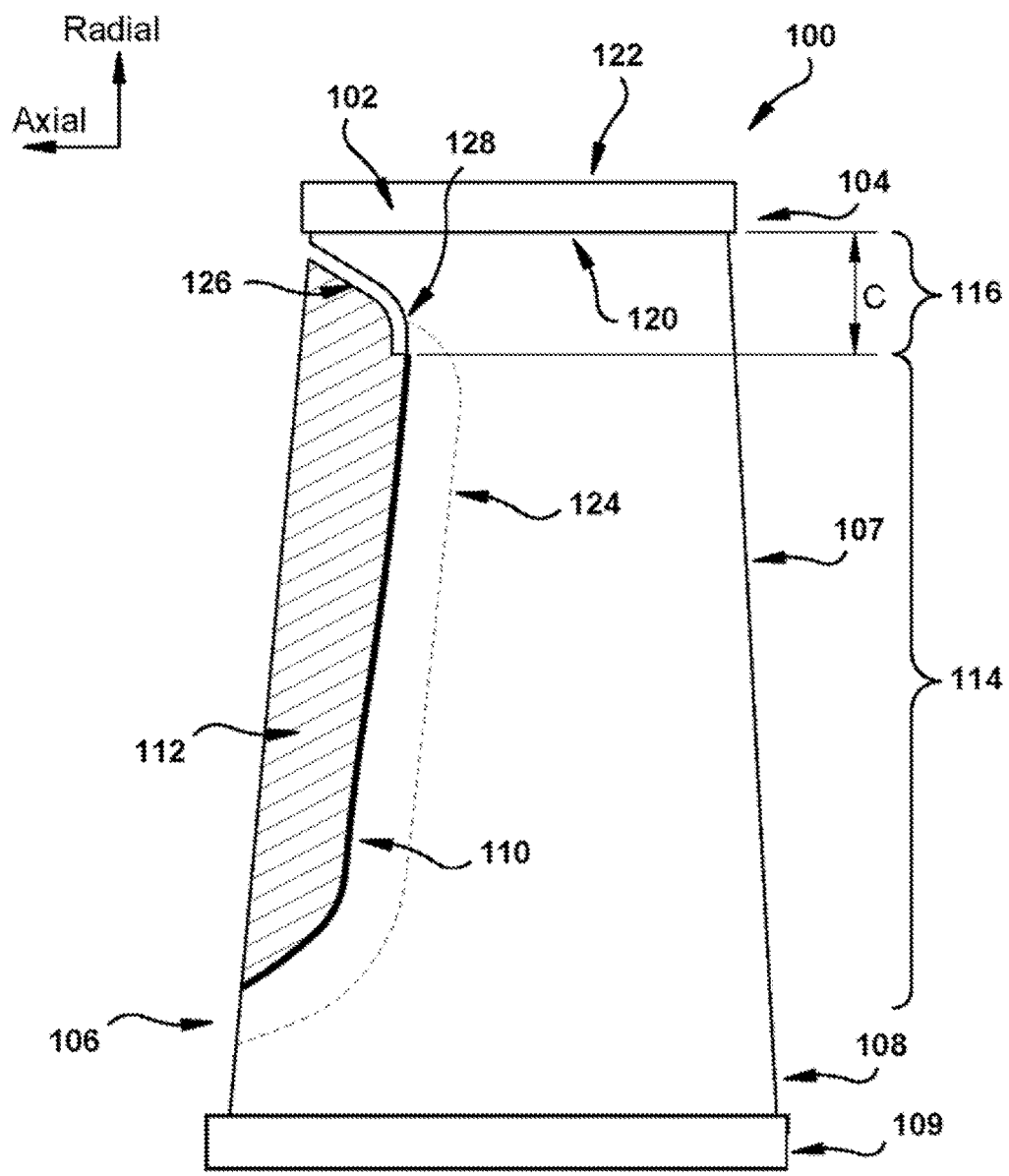
FIG. 2 shows a side view of a repaired turbine blade according to embodiments of the present disclosure.

The present disclosure aims to describe a more cost-effective repair method. In one embodiment, the method includes removing all of the WDE, including leading edge 106 nearest shroud 102. As shown in FIG. 2, an insert 112, also known as a coupon, may be welded to blade 100 to fill the area left by removing the WDE. To prevent heat damage to shroud 102, the weld may not extend the entire length of insert 112. Insert 112 may be welded to blade 100 starting at a distance C away from shroud 102. The distance may be determined, for example, by the blade material and the amount of erosion removed from blade 100. Welding may cause the surrounding blade to be negatively affected by high heat. The weld line that attaches insert 112 to blade 100 (weld region 114) may be far enough away from shroud 102 so that the thermally affected region 124 does not reach shroud 102. The region between insert 112 and blade 100 that is not welded may be called a weld-free region 116. Weld-free region 116 may extend from shroud 102 to weld region 114.

It will be recognized by a person skilled in the art that these aspects of the disclosure may be applied near a platform 109 of the blade instead of shroud 102 in an alternative embodiment. In an example embodiment, the trailing edge 107 nearest platform 109 may be removed. Insert 112 may be welded to blade 100 to fill the area left by removing the trailing edge 107 nearest platform 109 (embodiment not shown for brevity). Insert may be welded to blade 100 at a distance away from platform 109. The distance may be determined, for example, by the blade material and the amount of trailing edge 107 removed from blade 100. The weld may be far enough away from the platform 109 so that the thermally affected region does not reach platform 109.

As shown in FIG. 2, a gap 126 may be formed in weld-free region 116. The gap 126 may reduce interference between the blade 100 and the weld-free portion of insert 112. It should be understood that an omission of gap 126 does not depart from the present disclosure. However, omitting gap 126 may cause undesirable friction from vibration at the interface between blade 100 and the weld-free portion of insert 112. Gap 126 may also include a rounded portion 128 between shroud 102 and weld-free region 116. In one embodiment, rounded portion 128 may be formed at an interface between weld region 114 and weld-free region 116. Rounded portion 128 may assist in reducing stress concentrations at the interface between weld region 114 and weld-free region 116. In one embodiment, gap 126 may have a uniform width along the entire length of gap 126.

Figure 3:
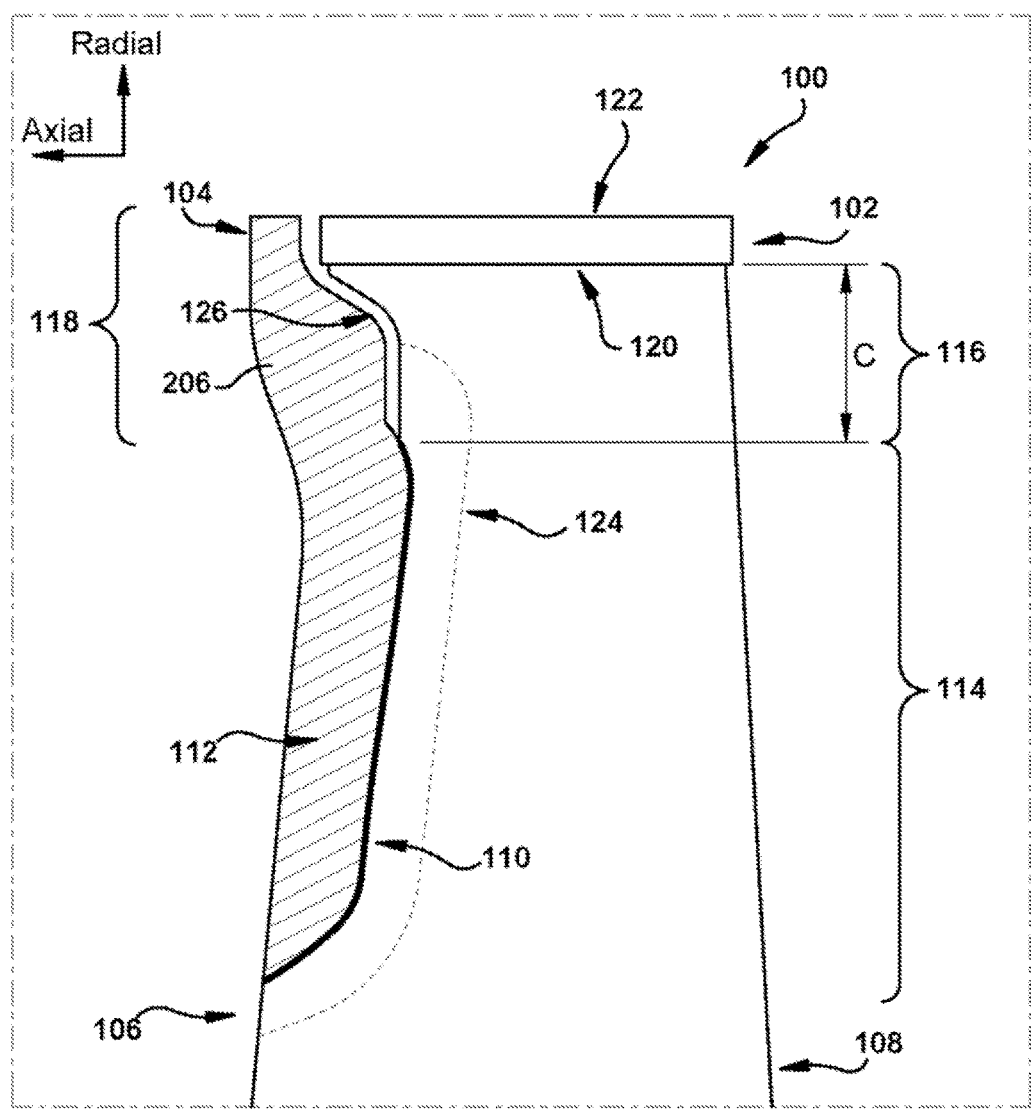
FIG. 3 shows a side view of a repaired turbine blade according to embodiments of the present disclosure.

As shown in FIG. 3, insert 112 may include a thick region 118 near shroud 102. Thick region 118 may be thicker than the rest of insert 112, e.g., axially and/or circumferentially. Thick region 118 may be thicker than the original airfoil, e.g., axially and/or circumferentially. Thick region 118 may assist in extending the operating lifetime of the repaired blade 100 because this region, leading edge 106 nearest shroud 102, typically suffers from the highest WDE. The repaired blade 100 may be operable for significantly longer than the original blade. In one embodiment, thick region 118 may be thicker than blade 100 in a circumferential direction, and may provide additional protection for gap 126 and the portion of the original blade adjacent to gap 126.

Insert 112 may include a material that is more durable to WDE than the original airfoil. For example, insert 112 may include a hardened material therein. The hardened material may be formed by flame hardening, high frequency hardening, induction hardening, laser hardening, or any other method of material hardening now know or later developed. In another embodiment, insert 112 may be the same material as the original bade. For example, insert 112 may be a hardened material of the original blade.

Insert 112 may extend passed the original leading edge 106 of blade 100 in the axial direction for additional protection. Insert 112 may extend passed original leading edge 106 of blade 100 along the entire weld-free region 116 in the axial direction. As shown in FIG. 3, in one embodiment, insert 112 may also or alternatively extend passed a base 120 of shroud 102 in the radial direction. In one embodiment, insert 112 may extend to an outermost surface 122 of shroud 102 in the radial direction. In another embodiment, shown in FIG. 4, insert 112 may not extend passed base 120 of shroud 102 in the radial direction.

Figure 4:
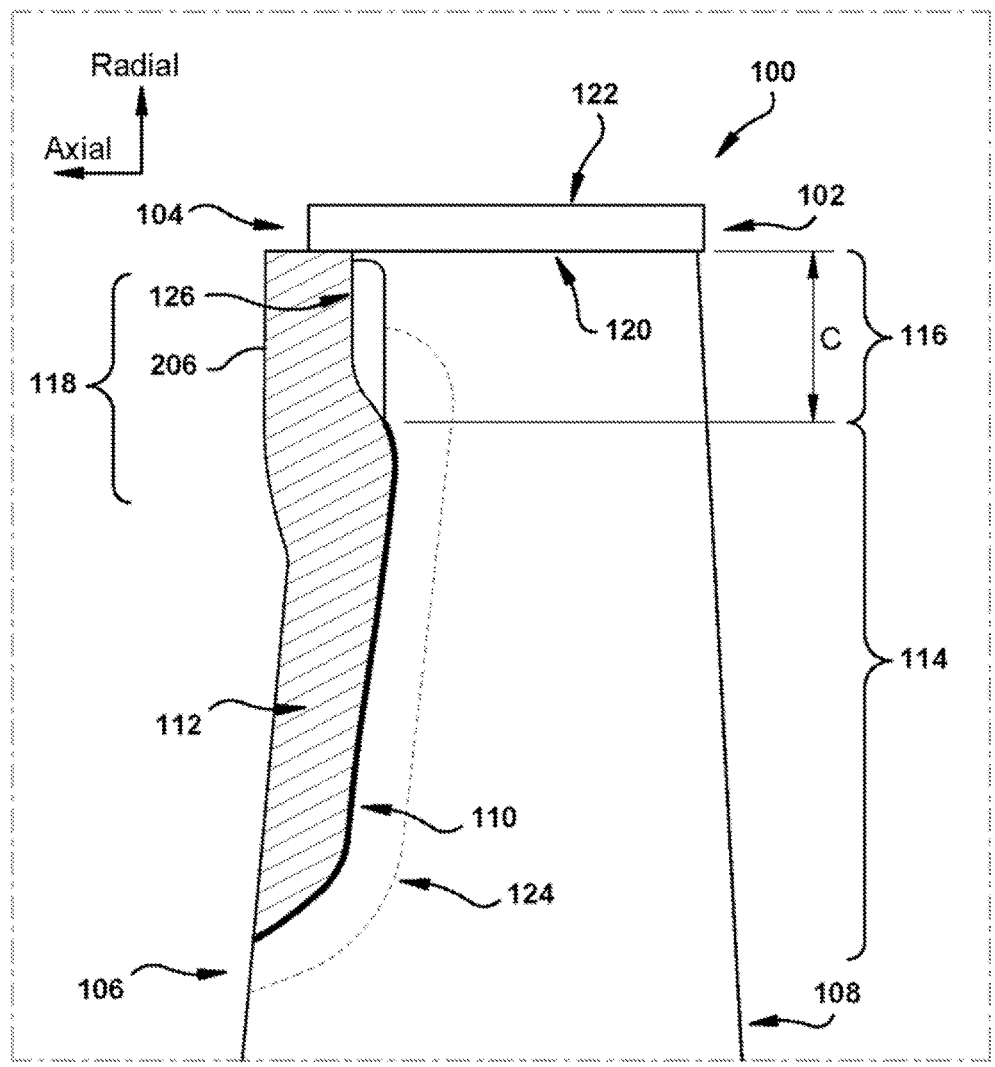
FIG. 4 shows a side view of a repaired turbine blade according to embodiments of the present disclosure.

In FIG. 2, insert 112 fits within an axial forward extent of shroud 102. In another embodiment, as shown in FIGS. 3-5, insert 112 need not provide a leading edge 206 that is identical to leading edge 106, e.g., it may extend more forwardly in an axial direction in one or more portions thereof beyond an axial forward extent of shroud 102.

As shown in FIGS. 2-6, a turbine blade 100 including a shroud 102 at a tip 104 of the blade 100 and a leading edge 106 extending between shroud 102 and a root 108 of blade 100 may include a cutout portion 110 extending at least along a portion of leading edge 106 of blade 100 nearest shroud 102. Cutout portion 110 may be formed by removing the eroded portion of blade 100. The dimensions and shape of cutout portion 110 may vary depending on the amount of erosion removed from blade 100. In one embodiment, insert 112 may be shaped to mate with cutout portion 110 at weld region 114. Insert 112 may be welded to cutout portion 110 at weld region 114. Insert 112 may not be welded to cutout portion 110 at weld-free region 116.

As noted, insert 112 may include a hardened material. Insert 112 may have an increased thickness nearest shroud 102, e.g., in the axial and/or circumferential direction. For example, a portion of insert 112 may extend beyond shroud 102 in an axial direction. A portion of insert 112 may extend beyond a base 120 of shroud 102 in a radial direction. A portion of insert 112 may extend to an outermost surface 122 of shroud 102 in a radial direction.

Figure 5:
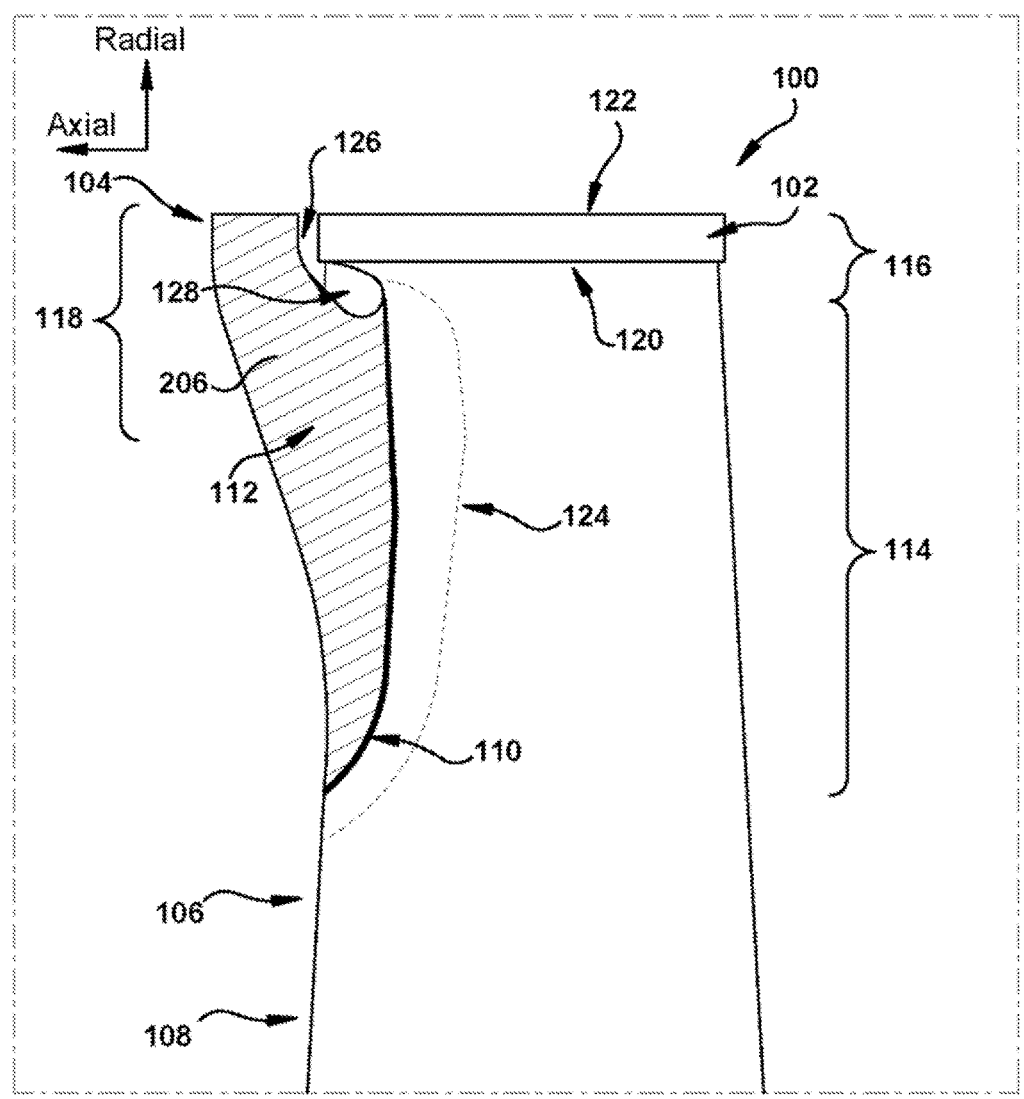
FIG. 5 shows a side view of a repaired turbine blade according to embodiments of the present disclosure.
Figure 6:
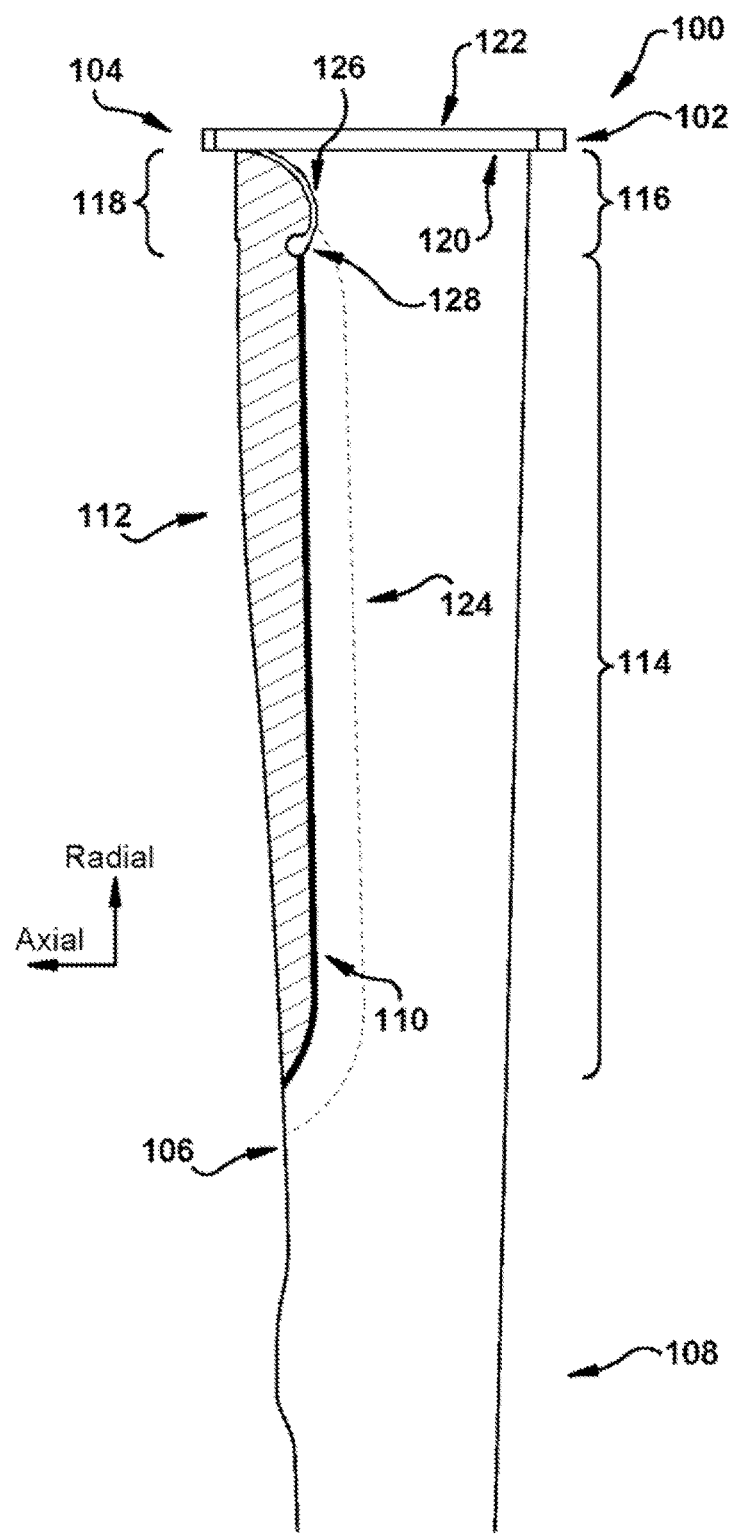
FIG. 6 shows a side view of a repaired turbine blade according to embodiments of the present disclosure.

As shown in FIGS. 2-6, weld region 114 may include a thermally affected zone 124, where the thermally affected zone 124 may not extend to shroud 102. Weld-free region 116 may include a gap 126 between insert 112 and cutout portion 110. Gap 126 may include a constant width along a length of gap 126. As shown in FIGS. 2, 5 and 6, gap 126 may include a rounded portion 128 between weld region 114 and weld-free region 116. In FIG. 2, rounded portion 128 is convex relative to shroud 102; in FIG. 5, rounded portion is concave relative to shroud 102, creating a larger gap 126 between shroud 102 and insert 112; and in FIG. 6, rounded portion 128 more convex (bulbous) relative to shroud 102. In one embodiment, shown in FIG. 6 for example, rounded portion 128 may be defined by insert 112 at the interface between weld region 114 and weld-free region 116. In other words, insert 112 may be shaped to include rounded portion 128 at the interface between weld region 114 and weld-free region 116. In such an embodiment, gap 126 may terminate at rounded portion 128.

The present disclosure describes one embodiment of a method for repairing a turbine blade 100 having a shroud 102 at a tip 104 of blade 100, the method includes removing an eroded portion 130 (FIG. 1) of leading edge 106 of blade 100 to form cutout portion 110, the removed eroded portion 130 including at least a portion of leading edge 106 nearest shroud 102, to form cutout portion 110. The method may include welding insert 112 to cutout portion 110 only at a weld region 114, wherein the weld region 114 is located a distance C from shroud 102.

The welding the insert 112 to the cutout portion 110 may include forming thermally affected zone 124 that does not extend to the shroud 102. Thermally affected zone 124 may be formed as a consequence of welding insert 112 to cutout portion 110 at weld region 114. The method may also include forming a gap 126 between insert 112 and cutout portion 110 at a weld-free region 116 nearest the shroud 102. The forming of gap 126 may include forming gap 126 with a constant width along a length of the gap 126. The forming of gap 126 may include forming a rounded portion 128 between weld region 114 and weld-free region 116. The forming of gap 126 may include forming insert 112 such that gap 126 is formed at weld-free region 116 when insert 112 is welded to cutout portion 110 at weld region 114. As noted, rounded portion 128 may be defined by insert 112 such that gap 126 terminates at rounded portion 128 at the interface between weld region 114 and weld-free region 116.

The method may also include forming insert 112 such that insert 112 has an increased thickness at least nearest shroud 102. The method may also include forming insert 112 such that insert 112 extends beyond shroud 102 in an axial direction. The method may also include forming insert 112 such that insert 112 extends beyond a base 120 of shroud 102 in a radial direction. The method may also include forming the insert 112 such that insert 112 extends to an outermost surface 122 of the shroud 102 in a radial direction. Insert 112 may be made using any now known or later developed techniques such as but not limited to machining and/or additive manufacturing.

The techniques described herein provide for easy welding, and avoid shroud deformation, increased material brittleness, and other heat damage that would result from close proximity to a weld. There is no welding of critical regions near the shroud and/or cover, yet the insert provides proven erosion resistance (with or without hardening), and is a cost effective repair method.

While embodiments of the disclosure have been described relative to repair of WDE in steam turbine blades, it is emphasized that the techniques may be equally applicable to other forms of erosion in turbine blades.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine blade comprising:
    a shroud at a tip of the blade and an airfoil having a leading edge extending between the shroud and a root of the blade;
    a cutout portion extending at least along the leading edge of the airfoil nearest the shroud;
    an insert welded to the cutout portion at a weld region; and
    a weld-free region located between the insert and the cutout portion nearest the shroud.

2. The turbine blade of claim 1, wherein the insert is a hardened material.

3. The turbine blade of claim 1, wherein the insert has an increased thickness nearest the shroud.

4. The turbine blade of claim 1, wherein a portion of the insert extends beyond the shroud in an axial direction.

5. The turbine blade of claim 1, wherein a portion of the insert extends beyond a base of the shroud in a radial direction.

6. The turbine blade of claim 1, wherein a portion of the insert extends to an outermost surface of the shroud in a radial direction.

7. The turbine blade of claim 1, wherein the weld region includes a thermally affected zone, and wherein the thermally affected zone does not extend to the shroud.

8. The turbine blade of claim 1, wherein the weld-free region between the insert and the cutout portion includes a gap.

9. The turbine blade of claim 8, wherein the gap includes a constant width along a length of the gap.

10. The turbine blade of claim 8, wherein the gap includes a rounded portion between the weld region and the weld-free region.

11. A method for forming a turbine blade having a shroud at a tip of the blade, the method comprising:
   removing a portion of a leading edge of an airfoil to form a cutout portion, the removed portion including at least a portion of the leading edge nearest the shroud; and
   welding an insert to the cutout portion only at a weld region, wherein the weld region is located a distance from the shroud, wherein the welding includes forming a gap between the insert and the cutout portion at a weld-free region nearest the shroud.

12. The method of claim 11, wherein the welding the insert to the cutout portion includes forming a thermally affected zone that does not extend to the shroud.

13. The method of claim 11, wherein the forming of the gap includes forming the gap with a constant width along a length of the gap.

14. The method of claim 11, wherein the forming of the gap includes forming a rounded portion between the weld region and the weld-free region.

15. The method of claim 11, further comprising forming the insert such that the insert has an increased thickness nearest the shroud.

16. The method of claim 11, further comprising forming the insert such that the insert extends beyond the shroud in an axial direction.

17. The method of claim 11, further comprising forming the insert such that the insert extends beyond a base of the shroud in a radial direction.

18. The method of claim 11, further comprising forming the insert such that the insert extends to an outermost surface of the shroud in a radial direction.

19. A turbine blade comprising:
   a platform at a root of the blade and an airfoil having a trailing edge extending between the platform and a tip of the blade;
   a cutout portion extending at least along the trailing edge of the airfoil nearest the platform;
   an insert welded to the cutout portion at a weld region; and
   a weld-free region located between the insert and the cutout portion nearest the platform.

* * * * *